(12) United States Patent
Dai

(10) Patent No.: US 10,328,987 B2
(45) Date of Patent: Jun. 25, 2019

(54) SELF-BALANCE VEHICLE

(71) Applicant: Dongguan Ranking Electronic Technology Co Ltd., Dongguan (CN)

(72) Inventor: Xiong Dai, Dongguan (CN)

(73) Assignee: Huashuang Li, Shenzhen (CN)

( * ) Notice: Subject to any disclaimer, the term of this patent is extended or adjusted under 35 U.S.C. 154(b) by 0 days.

(21) Appl. No.: 15/191,942

(22) Filed: Jun. 24, 2016

(65) Prior Publication Data

US 2017/0369118 A1    Dec. 28, 2017

(51) Int. Cl.
| | | |
|---|---|---|
| *B62K 11/00* | (2006.01) | |
| *B62K 3/00* | (2006.01) | |
| *B62J 25/00* | (2006.01) | |
| *B62J 23/00* | (2006.01) | |
| *B62J 6/00* | (2006.01) | |
| *B62J 99/00* | (2009.01) | |
| *B62M 7/12* | (2006.01) | |

(52) U.S. Cl.
CPC ............... *B62K 11/007* (2016.11); *B62J 6/00* (2013.01); *B62J 23/00* (2013.01); *B62J 25/00* (2013.01); *B62J 99/00* (2013.01); *B62K 3/002* (2013.01); *B62M 7/12* (2013.01); *B62J 2099/0006* (2013.01)

(58) Field of Classification Search
CPC .. B62K 3/007; B62K 3/002; B62J 6/00; B62J 23/00; B62J 25/00; B62J 99/00; B62M 7/12
USPC ........................................................ 180/218
See application file for complete search history.

(56) References Cited

U.S. PATENT DOCUMENTS

| | | | | |
|---|---|---|---|---|
| 3,042,378 | A * | 7/1962 | Preston | ..................... B66D 3/04 254/390 |
| 3,399,742 | A * | 9/1968 | Malick | ...................... B60T 1/06 180/21 |
| 8,356,681 | B2 * | 1/2013 | Gomi | .................... B60B 19/003 180/20 |
| 8,443,920 | B2 * | 5/2013 | Gomi | ....................... B62J 1/005 180/21 |
| 8,807,250 | B2 * | 8/2014 | Chen | ........................ B62K 1/00 180/21 |
| 9,731,783 | B2 * | 8/2017 | Artemev | .............. B60L 11/1864 |
| 2013/0228385 | A1 * | 9/2013 | Chen | ....................... B62K 3/007 180/6.5 |
| 2016/0185412 | A1 * | 6/2016 | Zuo | ......................... B62K 3/007 180/218 |
| 2016/0264203 | A1 * | 9/2016 | Ying | ..................... B62D 51/001 |
| 2016/0378106 | A1 * | 12/2016 | Xie | ........................... G07C 5/06 701/2 |

(Continued)

*Primary Examiner* — Jacob D Knutson
(74) *Attorney, Agent, or Firm* — Wayne & Ken, LLC; Tony Hom

(57) ABSTRACT

The present invention relates to a swing vehicle technical fields, and more particularly to a self-balance vehicle. It includes a main body of the self-balance vehicle, a first wheel and a second wheel, the first wheel and the second wheel is respectively installed at both sides of the main body of the self-balance vehicle, the outside of the first wheel is installed a folding first foot petal, the outside of the second wheel is installed a folding second foot petal. Compared with the prior art, in the self-balance vehicle of the present invention the first foot petal and the second foot petal can be overlapped, its volume is compact after folding, it is convenience for carry, its appearance is small and beautiful.

9 Claims, 5 Drawing Sheets

(56) References Cited

U.S. PATENT DOCUMENTS

2017/0166278 A1\* 6/2017 Lu .......................... B62K 3/007

\* cited by examiner

SELF-BALANCE VEHICLE

FIELD OF THE INVENTION

The present invention relates to a balance vehicle technical field, and more particularly to a self-balance vehicle.

BACKGROUND OF THE INVENTION

The self-balance vehicle is a vehicle to keep itself balance with gravity and make gravity itself to be the provider of the kinetic energy. The more of its carrying capacity, the more of its kinetic energy, it has good environmental performance. In the process of using, the drives need not worry about balance, the balancing stability of the vehicle itself enables the crowd, who can't drive the bicycle because of the balanced capacity barrier, to drive it too. The vehicle body is compact, easy to turn, it can work at an narrow work place with large turning angle. The all kinds of advantages of the self-balance vehicle allow itself to serve as a fast, environmental protection, safety, comfortable, small and flexible green vehicles, it is an alternative of the future vehicle and bicycle, it has a broad market and economic benefits.

However, the foot petal of the present balance can't fold, its volume is larger and it occupies space and it is inconvenient for carrying. The wheels of the regular self-balance vehicle are at both sides of the foot petal, the wheels of both sides and the plastic are circular. Once loss of control, the person falls from the vehicle, the vehicle will inertially roll forward, the self-balance vehicle will be damaged or other exceptional conditions happens. And the waterproof and the mudflaps are not set, it is hard to use on rainy days or on muddy roads, which limits its usable range; The lighting device is not set, it is inconvenient at night.

Accordingly, it urgently needs to provide a self-balanced vehicle to overcome the shortcomings of the prior art.

SUMMARY OF THE INVENTION

The object of the invention is to provide a self-balance vehicle, the first foot petal and the second petal can be folded, its volume is small and it is convenience to carry.

In order to achieve the above-described object, the invention provides the following technologies:

A self-balance vehicle includes a main body of the self-balance vehicle, a first wheel and a second wheel, the first wheel and the second wheel is respectively installed at both sides of the main body of the self-balance vehicle, the outside of the first wheel is installed a folding first foot petal, the outside of the second wheel is installed a folding second foot petal.

Preferably, the main body of the self-balance vehicle includes a battery box, a battery is arranged in the battery box, a battery press plate is arranged above the battery, a first cover plate is arranged above the battery press plate, the bottom surface of the first cover plate is provided with a first installation slot and a second installation slot, the first wheel is provided with a first rotation axle, the second wheel is provided with a second rotation axle, an end of the first rotation axle is arranged in the first installation slot, an end of the second rotation axle is arranged in the second installation slot.

Preferably, the other end of the first rotation axle is provided with a first connecting piece, the first connecting piece is provided with a first pivoting piece, the first pivoting piece is provide with a first pivot shaft, the first foot petal is arranged on the first pivoting piece, the first pivoting piece lies under the first rotation axle; the other end of the second rotation axle is provided with a second connecting piece, the second connecting piece is provided with a second pivoting piece, the second pivoting piece is provide with a second pivot shaft, the second foot petal is arranged on the second pivoting piece, the second pivoting piece lies under the second rotation axle.

Preferably, the first wheel is provided with a first waterproof cover and a second waterproof cover, the first waterproof cover and the second waterproof cover are overlapped each other; the second wheel is provided with a third waterproof cover and a fourth waterproof cover, the third waterproof cover and the fourth waterproof cover are fixed each other petal.

Preferably, both sides of the first wheel and both sides of the second wheel are respectively provided with a first face shell and a second face shell, the first face shell and the second face shell are overlapped each other, the first face shell and the second face shell is respectively provided with a handle.

Preferably, the main body of the self-balance vehicle is provided with a lighting device.

Preferably, the first foot petal includes a first bottom shell, the inside of the top surface of the first bottom shell is provide with a first rubber waterproof washer, the first bottom shell is provided with a first rubber anti-abrasion cushion, the first rubber anti-abrasion cushion is provided with a first rubber cushion; the second foot petal includes a second bottom shell, the inside of the top surface of the second bottom shell is provide with a second rubber waterproof washer, the second bottom shell is provided with a second rubber anti-abrasion cushion, the second rubber anti-abrasion cushion is provided with a second rubber cushion.

Preferably, the main body of the self-balance vehicle is provided with a bluetooth speaker.

Preferably, a first circuit boards is arranged in the first foot petal, a second circuit boards is arranged in the second foot petal.

Preferably, the first wheel is provided with a first driving motor, the second wheel is provided with a second driving motor.

The invention discloses a self-balance vehicle, includes the main body of the self-balance vehicle, the first wheel and the second wheel, the first wheel and the second wheel is respectively installed at both sides of the main body of the self-balance vehicle, the outside of the first wheel is installed the folding first foot petal, the outside of the second wheel is installed the folding second foot petal. Compared with the prior art, in the self-balance vehicle of the present invention the first foot petal and the second foot petal can be overlapped, its volume is compact after folding, it is convenience for carry, its appearance is small and beautiful.

DETAILED DESCRIPTION OF ILLUSTRATED EMBODIMENTS

The follows will further descript the present invention with the embodiments, which are the preferable embodiments in the present invention.

Figure 1:
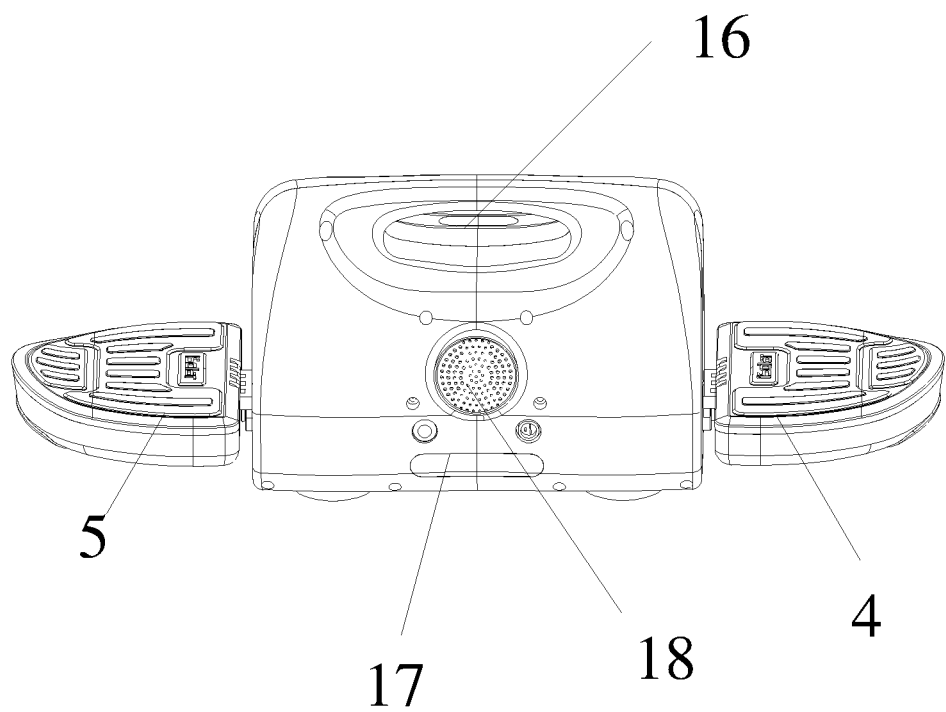
FIG. 1 is a front diagram of the self-balance vehicle in the present invention.
Figure 2:
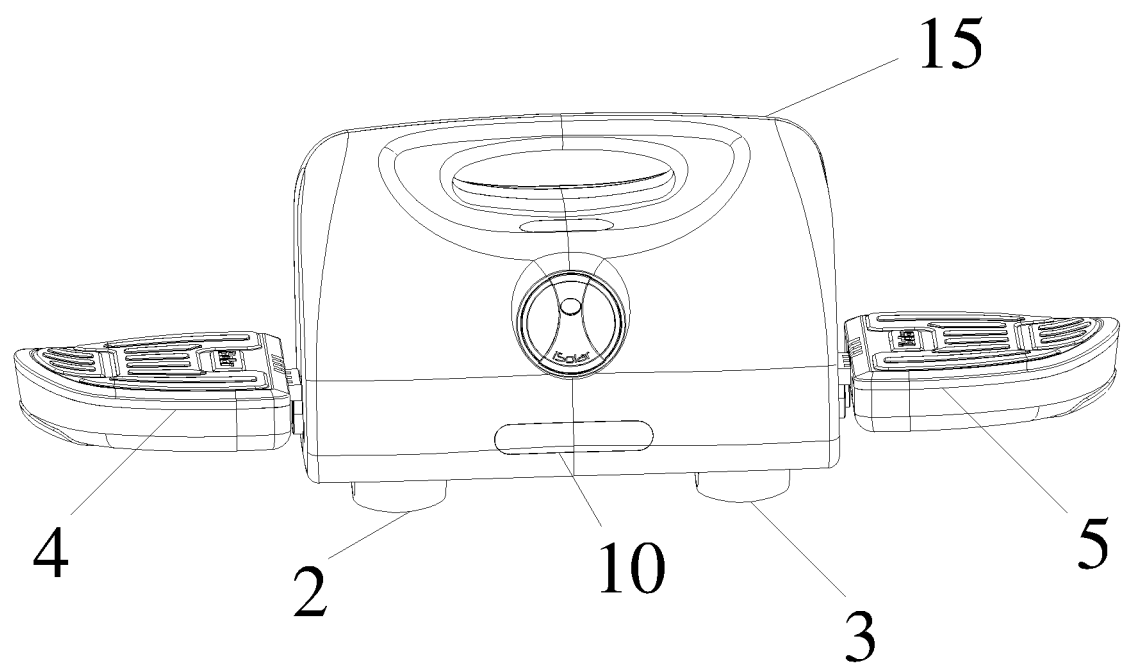
FIG. 2 is a back diagram of the self-balance vehicle in the present invention.
Figure 3:
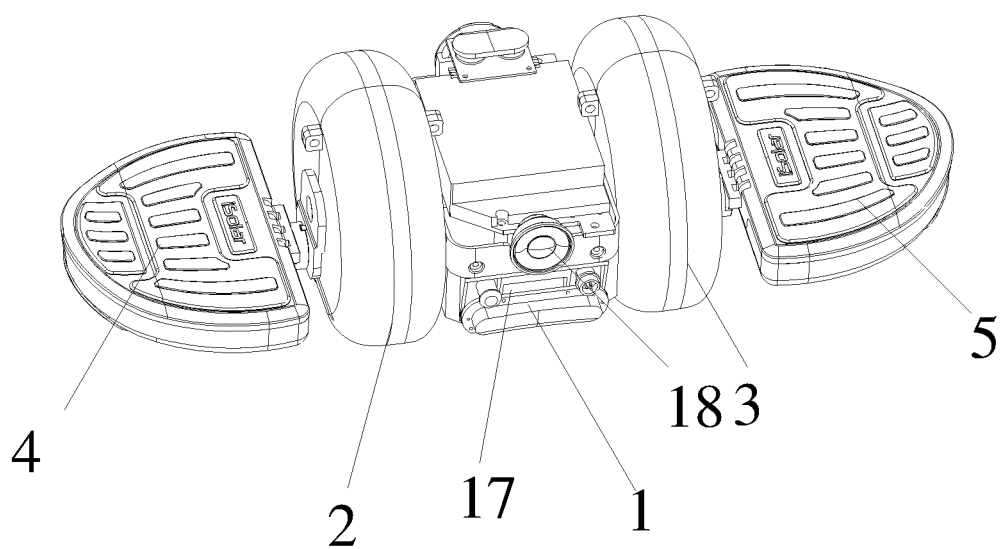
FIG. 3 is a block diagram of the self-balance vehicle in the present invention.
Figure 4:
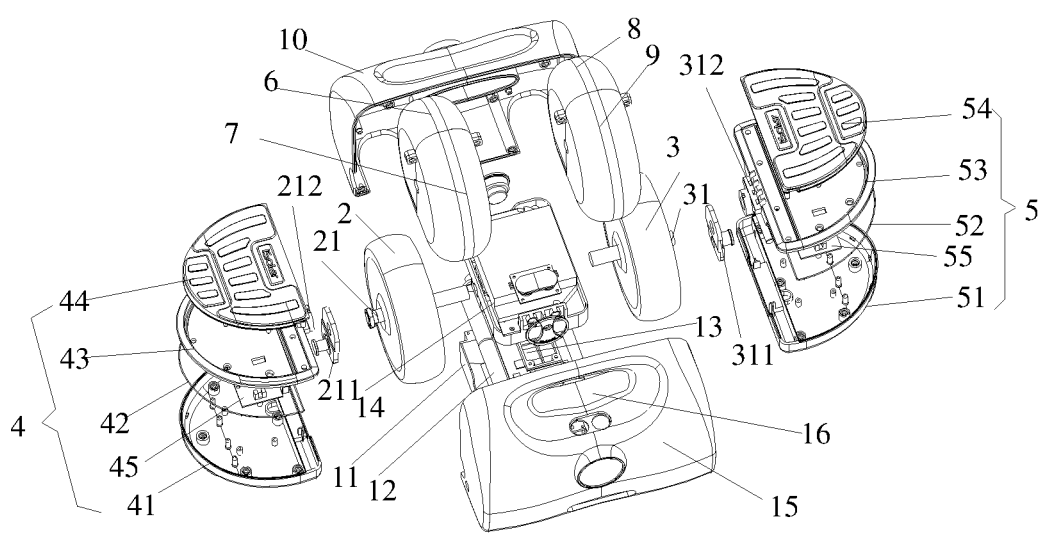
FIG. 4 is an exploded view of the self-balance vehicle in the present invention.
Figure 5:
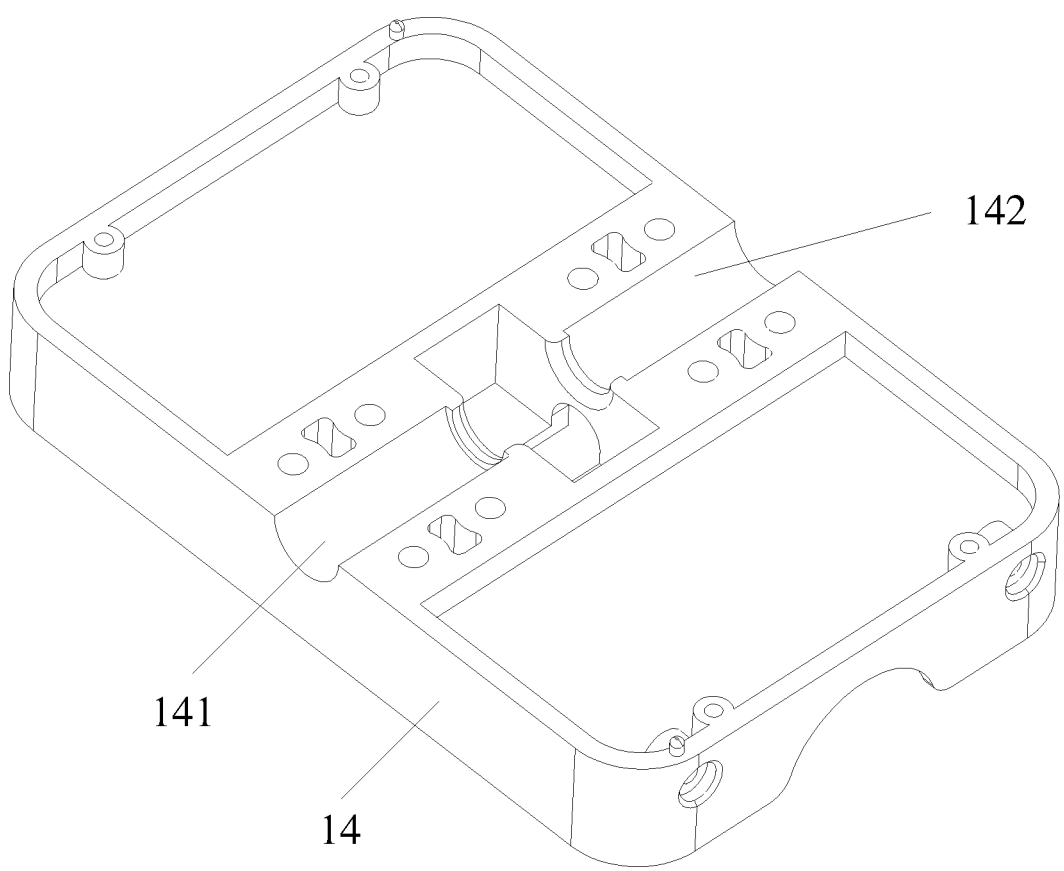
FIG. 5 is a block diagram of the first cover plate of the self-balance vehicle in the present invention.

Referring FIG. 1-5, a self-balance vehicle, comprising of the main body 1 of the self-balance vehicle, the first wheel 2 and the second wheel 3. The first wheel 2 and the second wheel 3 is respectively installed at both sides of the main body 1 of the self-balance vehicle, the outside of the first wheel 2 is installed a folding first foot petal 4, the outside of the second wheel is installed a folding second foot petal 5. The folding first foot petal 4 and the folding second foot petal 5 can be folded, its volume is compact after folding, and it is convenience to carry. The main body of the self-balance vehicle, the first wheel and the second wheel, the first wheel and the second wheel is respectively installed at both sides of the main body of the self-balance vehicle, the outside of the first wheel is installed the folding first foot petal, the outside of the second wheel is installed the folding second foot petal. Compared with the prior art, in the self-balance vehicle of the present invention the first foot petal and the second foot petal can be overlapped, its volume is compact after folding, it is convenience for carry, its appearance is small and beautiful. The main body of the self-balance vehicle, the first wheel and the second wheel, the first wheel and the second wheel is respectively installed at both sides of the main body of the self-balance vehicle, the outside of the first wheel is installed the folding first foot petal, the outside of the second wheel is installed the folding second foot petal. Compared with the prior art, in the self-balance vehicle of the present invention the first foot petal and the second foot petal can be overlapped, its volume is compact after folding, it is convenience for carry, its appearance is small and beautiful.

Preferably, the main body 1 of the self-balance vehicle includes a battery box 11, a battery 12 is arranged in the battery box 11, a battery press plate 13 is arranged above the battery 12, a first cover plate 14 is arranged above the battery press plate 13, the bottom surface of the first cover plate 14 is provided with a first installation slot 141 and a second installation slot 142, the first wheel 2 is provided with a first rotation axle 21, the second wheel 3 is provided with a second rotation axle 31, an end of the first rotation axle 21 is arranged in the first installation slot 141, an end of the second rotation axle 31 is arranged in the second installation slot 142.

Preferably, the other end of the first rotation axle 21 is provided with a first connecting piece 211, the first connecting piece 211 is provided with a first pivoting piece 212, the first pivoting piece 212 is provide with a first pivot shaft, the first foot petal 4 is arranged on the first pivoting piece 212, the first pivoting piece 212 lies under the first rotation axle 21; the other end of the second rotation axle 32 is provided with a second connecting piece 311, the second connecting piece 311 is provided with a second pivoting piece 312, the second pivoting piece 312 is provide with a second pivot shaft, the second foot petal 5 is arranged on the second pivoting piece 312, the second pivoting piece 312 lies under the second rotation axle 31. Because the first pivoting piece 212 lies under the first rotation axle 21, the second pivoting piece 312 lies under the second rotation axle 31, the centre of gravity of the first foot petal 4 and the centre of gravity of the second foot petal 5 respectively always lies under the centre of a circle of the first wheel 2 and the centre of a circle of the second wheel 3. In the state the driver's body loses balance, the body of the vehicle will not roll forward for inertia, which avoids to damaging the driver and the body of the vehicle or causing other safety accidents, it greatly improves the driving security performance and stability performance.

Preferably, the first wheel 2 is provided with a first waterproof cover 6 and a second waterproof cover 7, the first waterproof cover 6 and the second waterproof cover 7 are overlapped each other; the second wheel 3 is provided with a third waterproof cover 8 and a fourth waterproof cover 9, the third waterproof cover 8 and the fourth waterproof cover 9 are fixed each other petal. The first waterproof cover 6 and the second waterproof cover 7 have the function of retaining and mudflaps to the first wheel 2; The third waterproof cover 8 and the forth waterproof cover 9 have the function of retaining and mudflaps to the first wheel 3, which promises the driving safety and stability on the road with water or muddy, it broads the usable range.

Preferably, both sides of the first wheel 2 and both sides of the second wheel 3 are respectively provided with a first face shell 10 and a second face shell 15, the first face shell 10 and the second face shell 15 are overlapped each other, the first face shell 10 and the second face shell 15 is respectively provided with a handle 16. The first face shell 10 and the second face shell 15 have beautiful function. The handle 16 is set for convenience to rise and carry with single hand.

Preferably, the main body 1 of the self-balance vehicle is provided with a lighting device 17. The lighting device 17 has light function, it is convenience for driving at night.

Preferably, the first foot petal 4 includes a first bottom shell 41, the inside of the top surface of the first bottom shell 41 is provide with a first rubber waterproof washer 42, the first bottom shell 41 is provided with a first rubber anti-abrasion cushion 43, the first rubber anti-abrasion cushion 43 is provided with a first rubber cushion 44; the second foot petal 5 includes a second bottom shell 51, the inside of the top surface of the second bottom shell 51 is provide with a second rubber waterproof washer 52, the second bottom shell 51 is provided with a second rubber anti-abrasion cushion 53, the second rubber anti-abrasion cushion 53 is provided with a second rubber cushion 54. The first foot petal 4 and the second petal 5 is anti-abrasion, waterproof, long life.

Preferably, the main body 1 of the self-balance vehicle is provided with a bluetooth speaker 18.

Preferably, a first circuit boards 45 is arranged in the first foot petal 4, a second circuit boards 55 is arranged in the second foot petal 5.

Preferably, the first wheel 2 is provided with a first driving motor, the second wheel 3 is provided with a second driving motor.

The invention discloses a self-balance vehicle, includes the main body of the self-balance vehicle, the first wheel and the second wheel, the first wheel and the second wheel is respectively installed at both sides of the main body of the self-balance vehicle, the outside of the first wheel is installed the folding first foot petal, the outside of the second wheel is installed the folding second foot petal. Compared with the prior art, in the self-balance vehicle of the present invention the first foot petal and the second foot petal can be overlapped, its volume is compact after folding, it is convenience for carry.

While the specification has described in detail certain exemplary embodiments, it will be appreciated that those skilled in the art, upon attaining an understanding of the foregoing, may readily conceive of alterations to, variations of, and equivalents to these embodiments. The invention discloses a self-balance vehicle, includes the main body of the self-balance vehicle, the first wheel and the second wheel, the first wheel and the second wheel is respectively installed at both sides of the main body of the self-balance vehicle, the outside of the first wheel is installed the folding first foot petal, the outside of the second wheel is installed the folding second foot petal. Compared with the prior art, in the self-balance vehicle of the present invention the first foot petal and the second foot petal can be overlapped, its volume is compact after folding, it is convenience for carry, its appearance is small and beautiful.

What is claimed is:

1. A self-balance vehicle, comprising a main body of said self-balance vehicle, a first wheel and a second wheel, wherein said first wheel and said second wheel is respectively installed at both sides of said main body of said self-balance vehicle, outside of said first wheel is installed a folding first foot petal, outside of said second wheel is installed a folding second foot petal;

wherein said main body of said self-balance vehicle includes a battery box, a battery is arranged in said battery box, a battery press plate is arranged above said battery, a first cover plate is arranged above said battery press plate, said bottom surface of said first cover plate is provided with a first installation slot and a second installation slot, said first wheel is provided with a first rotation axle, said second wheel is provided with a second rotation axle, an end of said first rotation axle is arranged in said first installation slot, an end of said second rotation axle is arranged in said second installation slot.

2. A self-balance vehicle according claim 1, wherein the other end of said first rotation axle is provided with a first connecting piece, said first connecting piece is provided with a first pivoting piece, said first pivoting piece is provide with a first pivot shaft, said first foot petal is arranged on said first pivoting piece, said first pivoting piece lies under said first rotation axle; the other end of said second rotation axle is provided with a second connecting piece, said second connecting piece is provided with a second pivoting piece, said second pivoting piece is provide with a second pivot shaft, said second foot petal is arranged on said second pivoting piece, said second pivoting piece lies under said second rotation axle.

3. A self-balance vehicle according claim 1, wherein said first wheel is provided with a first waterproof cover and a second waterproof cover, said first waterproof cover and said second waterproof cover are overlapped each other; said second wheel is provided with a third waterproof cover and a fourth waterproof cover, said third waterproof cover and said fourth waterproof cover are fixed each other.

4. A self-balance vehicle according claim 1, wherein both sides of said first wheel and both sides of said second wheel are respectively provided with a first face shell and a second face shell, said first face shell and said second face shell are overlapped each other, said first face shell and said second face shell is respectively provided with a handle.

5. A self-balance vehicle according claim 1, wherein said main body of said self-balance vehicle is provided with a lighting device.

6. A self-balance vehicle according claim 1, wherein said first foot petal includes a first bottom shell, the inside of said top surface of said first bottom shell is provide with a first rubber waterproof washer, said first bottom shell is provided with a first rubber anti-abrasion cushion, said first rubber anti-abrasion cushion is provided with a first rubber cushion; said second foot petal includes a second bottom shell, the inside of said top surface of said second bottom shell is provide with a second rubber waterproof washer, said second bottom shell is provided with a second rubber anti-abrasion cushion, said second rubber anti-abrasion cushion is provided with a second rubber cushion.

7. A self-balance vehicle according claim 1, wherein said main body of said self-balance vehicle is provided with a bluetooth speaker.

8. A self-balance vehicle according claim 1, wherein a first circuit boards is arranged in said first foot petal, a second circuit boards is arranged in said second foot petal.

9. A self-balance vehicle according claim 1, wherein said first wheel is provided with a first driving motor, said second wheel is provided with a second driving motor.

* * * * *